INVENTOR.
FRANK INGENERI

INVENTOR.
FRANK INGENERI

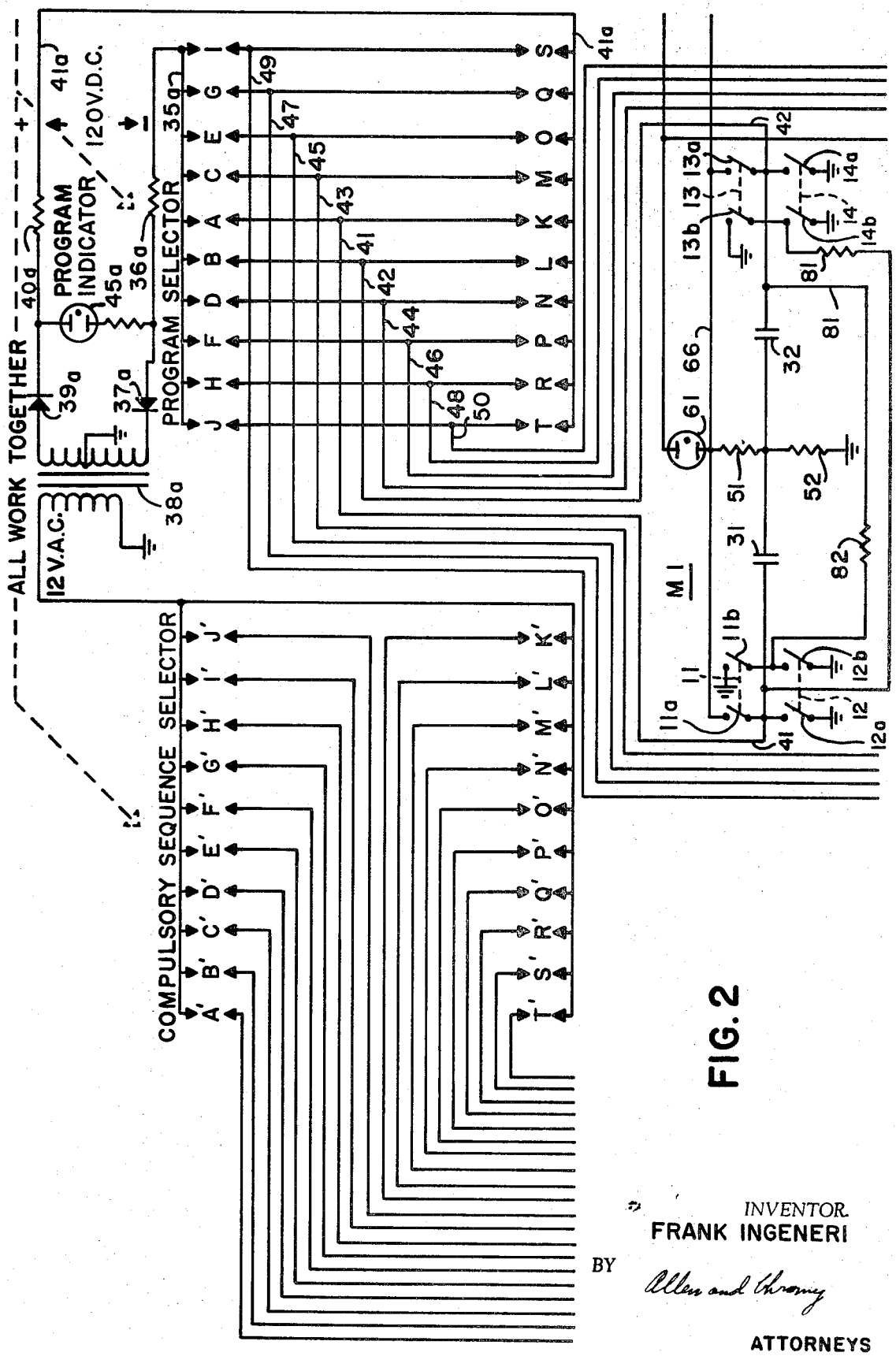

Nov. 17, 1970  F. INGENERI  3,540,138
SYSTEM FOR EVALUATING STUDENTS' EXAMINATIONS
Filed April 10, 1967  4 Sheets-Sheet 4

INVENTOR.
FRANK INGENERI
BY
Allen and Chromy
ATTORNEYS

United States Patent Office 3,540,138
Patented Nov. 17, 1970

3,540,138
SYSTEM FOR EVALUATING STUDENTS'
EXAMINATIONS
Frank Ingeneri, Santa Clara, Calif., assignor to Self Development Inc., San Jose, Calif., a corporation of California
Filed Apr. 10, 1967, Ser. No. 629,604
Int. Cl. G09b 7/06
U.S. Cl. 35—48
4 Claims

ABSTRACT OF THE DISCLOSURE

Electronic apparatus for examining and evaluating students' progress employing multiple choice answers to questions associated with electric switches of a temporary memory which is previously programmed in correlation with the questions. An auxiliary memory is activated if the correct answer is given by the student. Questions on sheets follow predetermined sequence which is coded to operate a step type sequence switch. Recording apparatus is adapted to be connected to the auxiliary memory by a selector switch so that correct answers to questions of each set are recorded after the set is answered and the student then proceeds to questions of the next set. Permanent record of the performance of each student is obtained in such form that it may be compared with all students in a class.

DESCRIPTION OF THE INVENTION

This invention relates to an electronic apparatus to be used in conducting examinations of students.

An object of this invention is to provide an improved electronic apparatus for facilitating the examination of students and recording the results.

Another object of this invention is to provide an electronic apparatus for use in examination of students which is both low cost to manufacture and low cost to maintain.

Another object of this invention is to provide an electronic apparatus for examination of students, the programming, grading and evaluation of the results all being accomplished by the apparatus after the instructor inserts the program card or other program-carrying device which also may be provided with a series of questions to be answered by the student by closing one of several switches associated with each question so that the data for evaluating the student's work is supplied to the apparatus in the form of electric signals and a record made thereof.

A further object of this invention is to provide an improved examination system in which certain examination papers are answered by the students in a predetermined sequence and the results recorded by an electronic apparatus in this predetermined sequence, whereby the records for all of the students in a group or class are arranged on a predetermined form related to said sequence, and the performance of each individual student and of the entire class is thus available as a permanent record for evaluation.

Other and further objects of this invention will be apparent to those skilled in the art to which it relates from the following specification, claims and drawing in which briefly:

FIGS. 2, 2a and 2b illustrate a schematic wiring diagram; these figures must be joined together as shown in FIG. 3.

Figure 1:
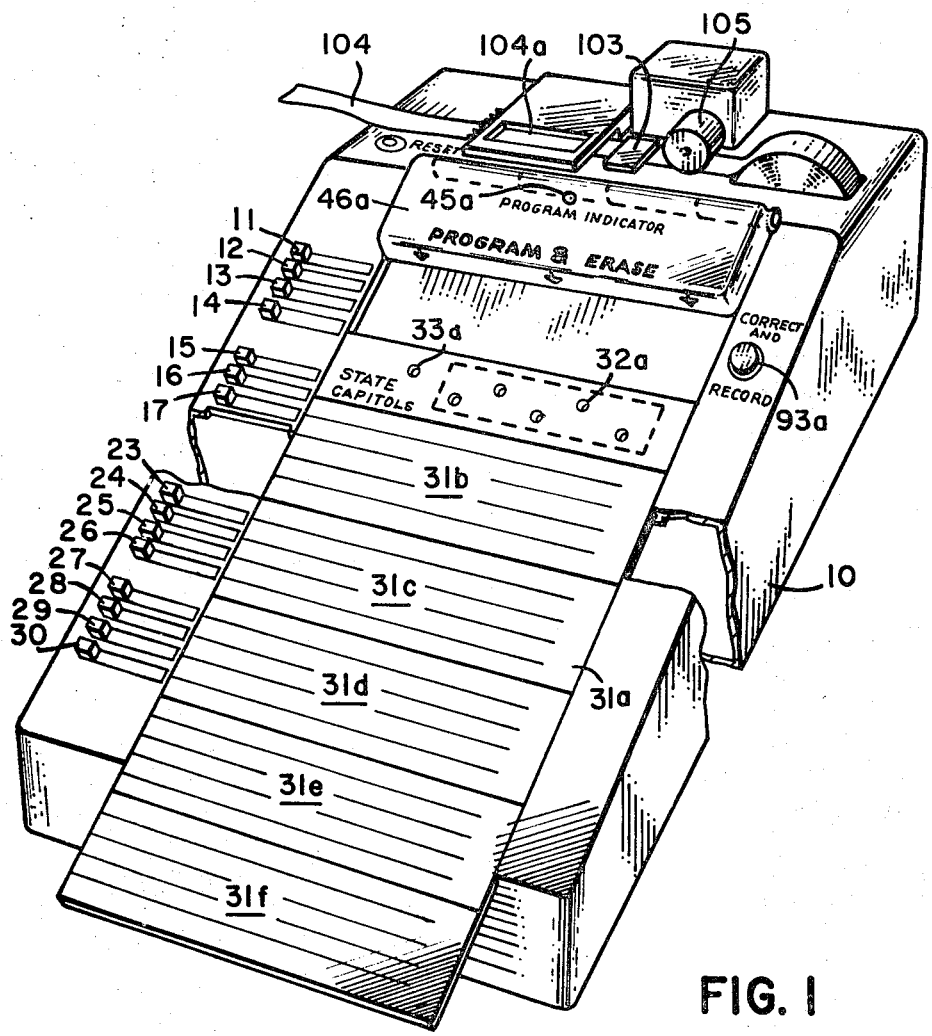
FIG. 1 is a perspective view of an embodiment of this invention.
Figure 3:
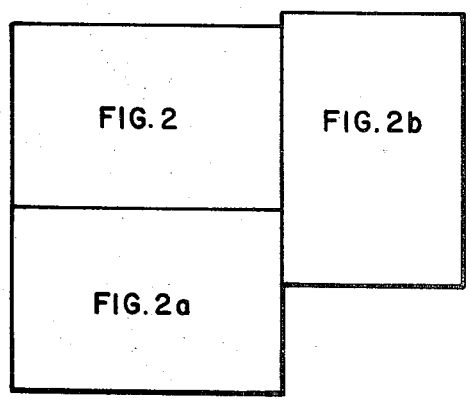
Figure 2A:
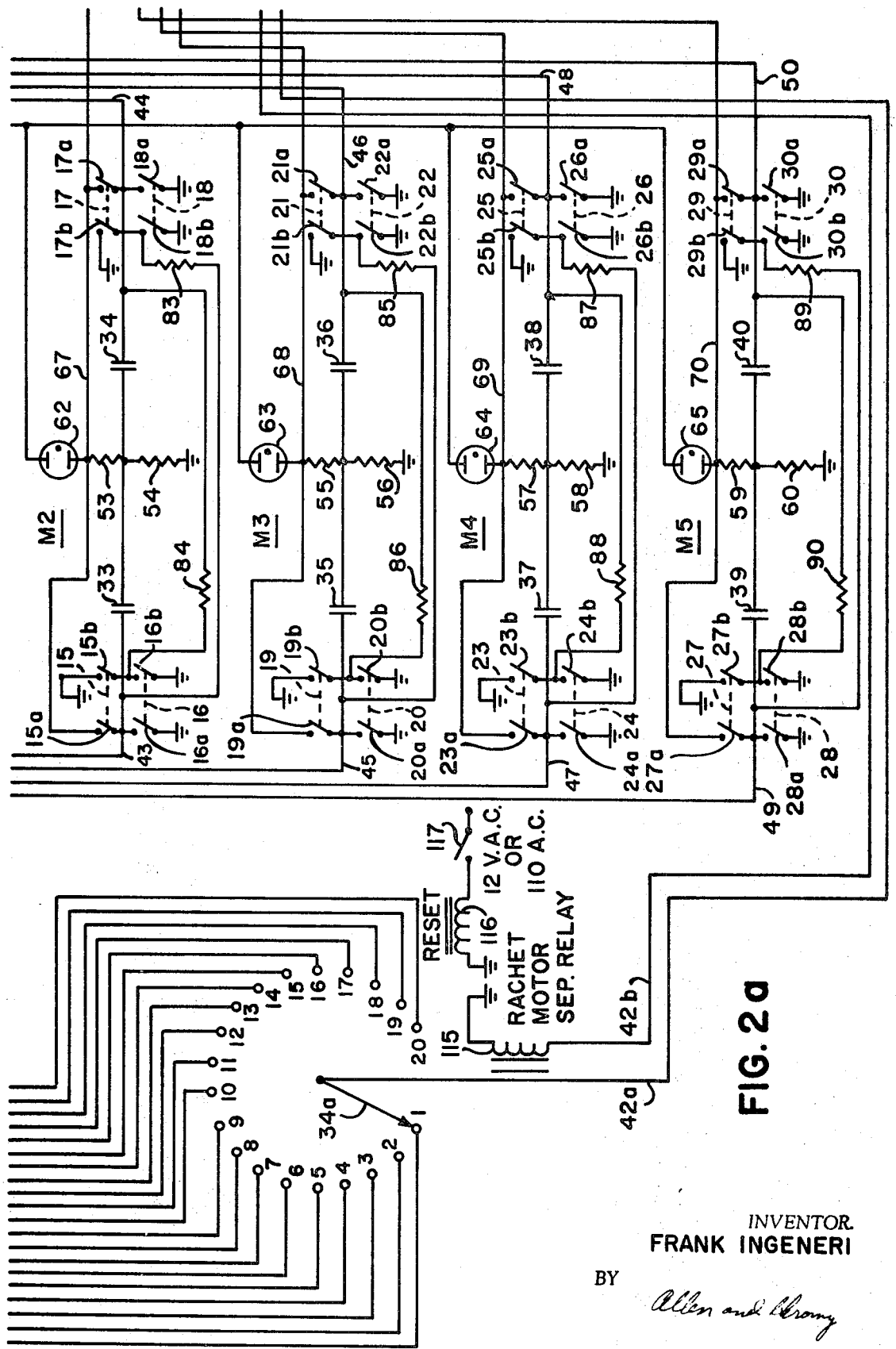
Figure 2B:
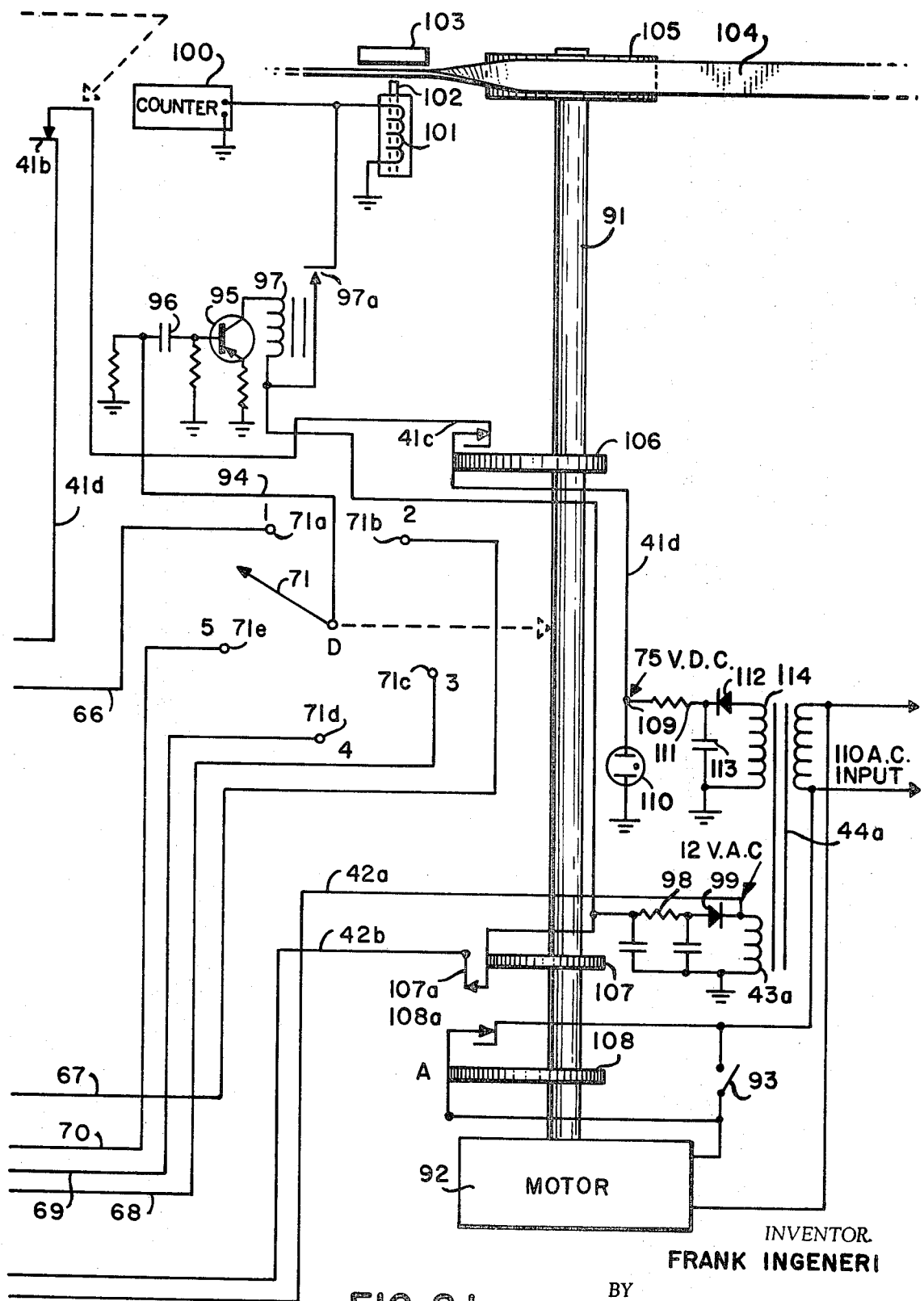

Referring to the drawing in detail, reference numeral 10 designates the cabinet for this apparatus which is broken in the central section thereof in order to reduce the length thereof in the illustration. This cabinet is provided with 20 actuators for manually operated switch units. Those actuators are positioned along the left hand side of the top of the cabinet and they are designated by the reference numerals 11 to 30, inclusive, some of which are shown in FIG. 1, and all of which are shown in FIGS. 2 and 2a of the drawing. Each of these switch units includes two switches designated by the suffixes a and b. Thus, switch 11 is provided with movable contacts and stationary contacts 11a and 11b, respectively, as shown in the wiring diagram, which are mechanically connected but electrically insulated so that they are actuated together. Likewise, the other switch units 12-30 each also include two switches that are mechanically connected for unitary operation. The top part of the cabinet 10 is gently sloping, as shown in FIG. 1, for receiving the sheet 31 of paper, cardboard or the like on which are printed or written five multiple choice questions, for example. Each question has associated therewith along the left hand side of the cardboard 31a four positions aligned with predetermined switches 11 to 30. The purpose of these switches and the correlation thereof with the questions will be described more fully hereinafter.

The top of the cardboard 31a is provided with five holes or apertures which are enclosed in the broken line 32a. These apertures cooperate with selected pairs of contacts A to T, shown in FIG. 2, as will be described in detail hereinafter for programming the five sections M1 to M5 inclusive, of the memory which are connected to one set of the pairs of contacts A to T. These memory sections may be of the type and construction disclosed in my application Ser. No. 375,593 filed June 16, 1964, now U.S. Pat. No. 3,327,405. Five apertures are employed in the card 31a, one aperture for each of the memory sections, so that the contacts of the selected pairs may be closed for an instant through the apertures.

A single program sequence aperture 33a is provided to the card 31a, and the position of this aperture on the card determines the sequence position of the particular examination card in the complete examination. In this arrangement a total of 20 examination cards or sheets may be employed in a given examination, and these examination cards must be answered in a predetermined sequence. Thus, if the aperture 33a is positioned to be aligned with the contacts A' of the sequence selector shown in FIG. 2, then this indicates that the examination questions on the card 31a are the first set of questions to be answered by the student, and at this time the sequence selector switch 34a must be on the first contact shown in FIG. 2a. In other words, the position of the sequence selector aperture 33a on the card selects the one of the sequence selector contacts A' to T' that must be engaged by the selector switch 34a when the particular card is being used by the student. This insures the proper sequence in which the examination cards are used by the student. The importance of this will be discussed in the operation of this apparatus.

It will be noted that one contact of each of the pairs of contacts A' to T', inclusive, is connected to a contact of the sequence selector switch 34a. Thus, one contact of the pair A' is connected to the first contact of the selector switch and so on through contacts B' to T', which is connected to the twentieth contact of the selector switch 34a. The other contacts of the pairs A' to T', inclusive, are connected together and to one side of the primary of transformer 38a.

In the case of the program selector contacts, it will be noted that one of the contacts of each of the pairs A to J, inclusive, is connected to the line 35a which is the negative DC line of the regulated 120 volt supply. This line is connected through the resistor 36a to the anode of the rectifier 37a. The cathode of this rectifier is connected to one side of the secondary of a step-up transformer 38a, the center of which is grounded to the metal chassis of this apparatus. The other side of this secondary is connected to the anode of rectifier 39a. The cathode of rectifier 39a is connected to one side of resistor 40a and the other side of this resistor is connected to the positive line 41a. Line 41a is connected to one contact of each of the pairs of contacts K to T, inclusive, of the program selector.

One side of the primary of the step-up transformer 38a is connected to one set of contacts of the pairs of contacts A' to T', inclusive, of the sequence selector as described, and the other side of the primary is grounded to the chassis. The other contacts of pairs of contacts A' to T', inclusive, are connected to contacts 1 to 20, inclusive, respectively, of the sequence selector switch 34a. The adjustable arm of the sequence selector switch 34a is connected by the line 42a to the 12 volt AC secondary 43a of the transformer 44a. The other side of this secondary is grounded. Thus, the primary of transformer 38a is energized from the secondary 43a of transformer 44a through the selector switch 34a, and the appropriate sequence selector aperture 33a of the examination card which permits the appropriate pair of the sequence selector contacts A' to T' to be closed, depending upon the particular examination card used. When the examination card employed is in proper sequence, the circuit is closed through the sequence selector switch 34a, transformer 38a is energized, and the program indicator light 45a which is connected across the rectifiers 37a and 39a is also energized. This light may be a gas discharge device employing neon or other suitable gas and it indicates that the correct examination card is in position in the device.

Indicator 45a may be positioned on the member 46a on the top of the apparatus cabinet 10, as shown in FIG. 1. One set of each of the pairs of contacts A to T, inclusive, of the program selector, and one set of each of the pairs of contacts A' to T', inclusive, of the sequence selector are positioned in the member 46a and project from the bottom surface thereof. The other sets of these contacts are positioned in the top panel of the cabinet 10 aligned with the contacts in the member 46a when this member is in its down position. Thus, the aligned contacts which are in registry with the apertures in the top of the card 31a are closed when the member 46a is in its down position. This member 46a is attached to the top of the cabinet 10 by a suitable hinge so that it may be tilted upward to receive the card 31a. In the program selector one of the contacts of pairs of contacts A to J, inclusive, are connected to one set of the pairs of contacts K to T, inclusive, respectively. These are preferably the stationary contacts mounted in the top of the cabinet 10.

Each of the memory circuits M1, M2, M3, M4 and M5 includes four pairs of switches, each pair being controlled by a single actuator which is positioned on the top of the cabinet. Thus, four actuators 11, 12, 13 and 14 are provided for controlling the pairs of switches 11a–11b, 12a–12b, 13a–13b and 14a–14b, respectively, of the memory M1. Actuators 15, 16, 17 and 18 are provided for controlling switches 15a–15b, 16a–16b, 17a–17b and 18a–18b, respectively, of memory M2. Actuators 19, 20, 21 and 22 are provided for controlling switches 19a–19b, 20a–20b, 21a–21b and 22a–22b, respectively, of memory M3. Actuators 23, 24, 25 and 26 are provided for controlling switches 23a–23b, 24a–24b, 25a–25b and 26a–26b, respectively, of memory M4. Likewise, actuators 27, 28, 29 and 30 are provided for controlling switches 27a–27b, 28a–28b, 29a–29b, and 30a–30b, respectively, of memory M5.

The stationary contacts of program selector switches A and K are connected togther to line 41 which leads to switches 11a and 12a, and one side of capacitor 31 of memory M1. The stationary contacts of program selector switches B and L are connected to line 42 which leads to switches 13a and 14a, and to one side of capacitor 32 of memory M1. The other sides of capacitors 31 and 32 are connected together and to the common connection of resistors 51 and 52. The stationary contacts of program selector switches C and M are connected to line 43 which leads to the switches 15a and 16a and to one side of the capacitor 33 of memory M2. The stationary contacts of program selector switches D and N are connected to line 44 which leads to switches 17a and 18a and to one side of capacitor 34 of memory M2. The other sides of capacitors 33 and 34 of memory M2 are connected together to a common connection between resistors 53 and 54. The stationary contacts of program selector switches E and O are connected to line 45 which leads to the switches 19a and 20a and to one side of capacitor 35 of memory M3. The stationary contacts of program selector switches F and P are connected to line 46 which leads to switches 21a and 22a and to one side of capacitor 36 of memory M3. The other sides of capacitors 35 and 36 are connected to the common connection between resistors 55 and 56 of memory M3. The stationary contactors of program selector switches G and Q are connected to line 47 which leads to switches 23a and 24a and to one side of capacitor 37 of memory M4. The stationary contacts of program selector switches H and R are connected to line 48 which leads to switches 25a and 26a and to one side of capacitor 38 of memory M4. The other sides of capacitors 37 and 38 are connected to a common connection between resistors 57 and 58. Similarly, switches 27a and 28a and one side of capacitor 39 of memory M5 are connected by line 49 to the stationary contacts of the program selector switches I and S. Also, switches 29a and 30a and one side of capacitor 40 of memory M5 are connected by line 50 to the other contacts of program selector switches J and T. The other sides of capacitors 39 and 40 are connected to the common connection between resistors 59 and 60.

The memories M1, M2, M3, M4 and M5 are provided with tubes 61, 62, 63, 64 and 65, respectively, each of which may be in the form of a small gas discharge tube having neon or similar inert gas atmosphere therein so that this atmosphere glows when the electrodes of the tube are suitably energized. The top electrodes of the tubes 61, 62, 63, 64 and 65 are connected to the positive supply line 41d. The lower electrode of tube 61 is connected to the line 66 which is connected to switches 11a and 13a and to the top terminal of resistor 51, and also to the contact 71a of the motor driven switch 71. The bottom electrode of tube 61 is connected to the line 67 which is connected to switches 15a and 17a and to the top terminal of resistor 53, and also to the contact 71b of switch 71. The lower terminal electrode of tube 63 is connected to the line 68 which is also connected to switches 19a and 21a, and to the top terminal of resistor 55 and also to the contact 71c of switch 71. Likewise, the lower electrode of tube 64 is connected to the line 69 which is connected to switches 23a and 25a and to the top terminal of resistor 57 and also to the contact 71d of switch 71. Also, the lower electrode of tube 65 is connected to line 70 which is connected to switches 27a and 29a and to the top terminal of resistor 59, and also to contact 71e of the switch 71.

One of the contacts of each of the switches 11b, 12a, 12b, 13b, 14a and 14b of memory M1 is grounded to the chassis. In addition, the bottom terminal of resistor 52 is also grounded to the chassis of the apparatus. Memory M1 is also provided with a resistor 81 which is connected between switches 13b and 14b and line 41. Another resistor 82 is provided between switches 11b and 12b and line 42. The purpose of these resistors will be discussed in the description of the operation of this apparatus.

Memory M2 is likewise provided with ground connections between switches 15b, 16a, 16b, 17b, 18a and 18b, respectively. This memory is also provided with resistors 83 and 84. Resistor 83 is connected between switches 17b and 18b and line 43, while resistor 84 is connected between switches 15b and 16b and line 44. In memory M3 switches 19b, 20a, 20b, 21b, 22a and 22b are also grounded to the chassis. This memory is also provided with resistors 85 and 86. Resistor 85 is connected between switches 21b and 22b and line 45, whereas, resistor 86 is connected between switches 19b and 20b and line 46. The top terminals of switches 23b and 25b and the bottom terminals of switches 24a, 24b, 26a and 26b of memory M4 are grounded to the chassis of the apparatus. Memory M4 is provided with a resistor 87, the top terminal of which is connected to the bottom terminal of switch 25 and top terminal of switch 26b, and the bottom terminal of which is connected to line 47. Resistor 88 is provided to memory M4 and the left hand side of this resistor is connected to the bottom terminal of switch 23b and top terminal switch 24b and the right hand terminal of this resistor is connected to the line 48. Memory M5 is provided with resistors 89 and 90. Resistor 89 is connected with the top terminal thereof to the bottom terminal of switch 29b and top terminal switch 30b. The bottom terminal of resistor 89 is connected to line 49. The left hand side of the resistor 90 is connected to the lower terminal of switch 27b and upper terminal of switch 28b and the right hand side of this resistor is connected to the line 50.

The lines 66, 67, 68, 69 and 70 of memories M1, M2, M3, M4 and M5, respectively, are connected to contacts 71a, 71b, 71c, 71d and 71e, respectively, of the motor driven switch 71. The wiper arm of this switch is mechanically connected to the shaft 91 which is driven by the motor 92 when the record switch 93 is closed so that this motor is energized from the 110 volt AC line. The wiper arm of the motor driven switch 71 engages contacts 71a, 71b, 71c, 71d and 71e in sequence and supplies signals from the memory circuits M1, M2, M3, M4 and M5 in this sequence to line 94 if the correct answers were supplied by the student in answering the questions on card 31a. Line 94 is coupled to the base of transistor 95 by the capacitor 96.

The emitter of transistor 95 is grounded through a suitable resistor and the collector is connected to the upper terminal of the relay 97. The lower terminal of this relay is connected to the negative terminal of the filter 98 which is connected to the secondary 43a of transformer 44a by rectifier 99 to provide a 12 volt DC supply to the transistor. Current flowing through transistor 95 in response to signals applied to the base of the transistor over line 94 passes through solenoid 97 of the relay and, as a result, the contacts 97a thereof are closed. Current from the filter rectifier 98–99 is supplied through closed contacts 97a to the solenoid actuated counter 100 which is of conventional construction, and also to the solenoid 101 of the tape punch to act via the punch 102 thereof against anvil 103 and perforate the tape 104.

The tape 104 is advanced by the drive roller 105 which is attached to the motor driven shaft 91. Cams 106, 107 and 108 are provided to the shaft 91 for actuating and controlling the switches 41c, 107a and 108a, respectively. Switch 41c is connected in series with switch 41b in the line 41d which is connected to the positive terminal 109 of the regulated 75 volt DC supply. This supply employs a regulator tube 110, current limiting resistor 111, rectifier 112 and filter capacitor 113 connected to secondary 114 of transformer 44a. The positive line 41d also connects switch 41b to tubes 61, 62, 63, 64 and 65.

Switch 41b is normally closed but is opened momentarily when the member 46a is pressed down after the question card 31a is inserted on the top of the cabinet of the apparatus during the programming of the apparatus. This is to keep the positive potential from being applied from the 75 volt supply terminal 109 to the line 41d at this time so as to prevent ignition of the neon tubes 61 to 65 accidentally during the programming of the apparatus. In addition, relatively high resistance resistors 36a and 40a are connected in series with the negative line 35a and positive line 41a, respectively, to keep the charging currents for the capacitors in the memories M1 to M5 to low values during the programming. These charging currents are kept at low values so that the voltage drops across resistors 51 to 60 are kept low during the programming.

Switch 41c is opened by cam 106 just before the end of a cycle of operation so that any tubes 61 to 65 that were fired are de-energized. Switch 107a which is controlled by cam 107 is connected to the 12 volt DC supply and to line 42b leading to the solenoid 115 of the ratchet motor or step relay which functions to advance the rotatable arm 34a of the sequence selector switch one step when it receives a pulse, that is, when switch 107a is closed by cam 107 during each revolution of the shaft 91. Switch 108a which is controlled by the cam 108 is connected in parallel with the record switch 93. Switch 108a is closed by the cam after the motor is started by closing the record switch 93 so that the motor 92 is energized from the 110 volt A.C. supply for one rotation of the cam 108 without keeping the record switch closed by manual operation thereof continuously during this rotation of shaft 91.

The operation of this apparatus is as follows: The instructor in charge of the examination closes switch 117 which connects the reset solenoid 116 of the sequence selector switch, either to a 12 volt or 110 volt A.C. supply. Reset solenoid 116 then functions to rotate the contact arm 34a of the sequence selector switch to the number one contact so that the sequence selector is in its starting position. The apparatus is in condition to receive the first examination card 31a. The student then places his name on the tape 104 in the space 104a, shown in FIG. 1. Card 31a is then placed on the top of the apparatus by lifting the member 46a so that the apparatus in the section 32a and sequence selector aperture 33a are positioned under member 46a when this member is brought down. Indicator light 45a is now energized since transformer 38a is connected to a current supply through the sequence selector. Bringing the member 46a down permits certain of the contacts A to T, inclusive, to close predetermined circuits to memories M1 and M5 and charge selected capacitors thereof in predetermined directions.

The card 31a is provided with five questions, each of which is provided with a multiple choice of four answers, one of which is correct. These multiple choice four answers are aligned with the switch actuators 11 to 30 when the card 31a is properly positioned on the top of the cabinet 10 of the apparatus. The correct answers to the questions are aligned with the predetermined switch actuators corresponding to the switch pairs in the various memories M1 to M5 which must be closed in order to fire the gas tubes 61 to 65 when the questions are being answered by the student actuating the aforesaid actuators.

In programming this apparatus, let it be assumed that the card 31a is perforated so that contacts A, G, N, F, T are closed when member 46a is brought down, whereby line 41a provides a negative charge to the capacitor 31, line 44 provides a positive charge to capacitor 34, line 46 provides a negative charge to capacitor 36, line 47 provides a negative charge to capacitor 37, and line 50 provides a positive charge to capacitor 40.

With this program, the student will receive a perfect score for the questions if he closes the switches as follows: Close switch 12a to provide a positive potential to the lower electrode of neon tube 61 from capacitor 31 to fire this tube; close switch 17a to connect capacitor across resistor 53 and provide a positive potential therefrom at the bottom electrode of neon tube 62; close switch 22a to connect capacitor 36 across resistor 56 and provide positive potential therefrom to the bottom electrode of neon tube 63; switch 24a to connect capacitor 37 across resistor 58 and provide a positive potential to the bottom electrode of neon tube 64; and switch 29a to connect capacitor across resistor 59 and provide a positive potential to the bottom electrode of neon tube 65. Supplying the firing potentials to the tubes 61-65 from the capacitors as described supplements the potential from the 75 volt DC supply provided to these tubes over line 41d so that the atmospheres in these tubes are ionized or fired.

If the student instead of operating actuator 12 associated with memory M1 actuated either 11, 13 or 14, then the capacitor 31 would have been discharged without applying the required positive firing potential to the bottom electrode of the neon tube 61. Likewise, if any switch other than switches 17a-17b were closed in memory M2, then capacitor 34 would have been discharged without firing neon tube 62. The same is true in the cases of memories M3, M4 and M5 if switches other than switches 22a-22b, switches 24a-24b and switches 29a-29b, respectively, had been closed.

If the student, after he has answered the questions on card 31a by operating certain of the actuators 11 to 30, as described, desires to change his answers to some of the questions, he may start all over simply by reprogramming the apparatus by pressing down on the member 46a so that the memories M1 to M5, inclusive, are reprogrammed. At the same time, his previous answers are erased since in this reprogramming operation the switch 41b was momentarily opened so that any of the tubes 61 to 65, inclusive, that may have been fired are de-energized.

After the student has answered the questions on card 31a and is satisfied with his answers, the correct answers are recorded on tape 104 by the punch 102 which is actuated by solenoid 101. The recording procedure is initiated by closing the record switch 93 which is actuated by the pushbutton 93a. Switch 93 closes the circuit between the motor 92 and the 110 volt A.C. supply line. Motor 92 rotates shaft 91 and in doing so rotates cam 108 which functions to close switch 108a. Switch 108a is connected across the pushbutton switch 93 so that after the motor is started this pushbutton may be released and the motor continues operating through its cycle of operation in which it rotates the swich arm 71 which engages contacts 71a and 71e in sequence. Contacts 71a to 71e are connected through lines 66 to 70, respectively, to the memories M1 to M5, respectively, so that signals from these lines are supplied to the input of transistor 95 in sequence. For example, if it is assumed that the student answered the first question correctly and tube 61 of memory M1 is energized, then when the wiper 71 engages contact 71a, a pulse is supplied to the base of transistor 95 which becomes conductive. Current passing through transistor 95 passes through the winding 97 of the relay which closes contacts 97a. Solenoid 101 is energized and drives the punch 102 thereof through the paper against the anvil 103. The perforation in the tape 104 indicates that the first question on card 31a was answered correctly. Also, counter 100 is energized to indicate that one question was answered correctly. Tape 104 is rotated by the roller 105 which is driven by motor 92 in step with rotation of the wiper 71. If the student did not answer the second question correctly, then when the wiper 71 engages contact 71b, no signal will be supplied to the transistor 95 and, accordingly, no perforation will be made in tape 104 for this question. However, if the remaining three questions were answered correctly, then three perforations will appear spaced on the tape 104. Near the end of the revolution of shaft 91 cam 106 functions to open switch 41c so that all of the tubes 61 to 65 inclusive which may have been fired are de-energized after the wiper 71 passes contact 71e. At the same time, cam 107 functions to close switch 107a so that line 42b is connected to the 12 volt D.C. supply and the winding 115 of the ratchet motor associated with the wiper 34a of the sequence selector switch is energized by an electric pulse and advances or steps the wiper 34a from the first contact to the second contact. The apparatus is now in condition with the second question card, which is similar to card 31a except that the apertures in block 32a, which function in the programming of the memories, may be in different positions and aperture 33a is positioned so that contacts B' of the sequence selector are closed therethrough when the card is positioned on the cabinet of the apparatus under the member 46a, that is, the upper end of the card is positioned under this member.

The sequence selector is provided with twenty A' to T' contact pairs, inclusive, so that a sequence of twenty examination cards such as card 31a may be provided to this apparatus to make up the complete examination, and, of course, these cards must be taken in the correct sequence so that they permit closing of contact pairs A' to T' in sequence.

After the student has answered all of the examination questions on the complete sequence of cards and a suitable record of the answers has been made on the tape 104, this tape is removed from the apparatus and may be pasted on a master board so that it extends horizontally across this board. Likewise, the tapes from the examinations of the other students taking the same examination may be pasted on this board so that all of the tapes extend horizontally across the board and the positions for the various examination questions line up in vertical columns. In this way the instructor can evaluate the work of the class and determine if any particular types of questions or problems are proving more difficult than others to the students.

While I have shown a preferred embodiment of my invention, it will be understood that the invention is capable of variation and modification from the form shown so that the scope thereof should be limited only by the scope of the claims appended hereto.

What I claim is:

1. In apparatus for conducting examinations of students and recording the results thereof, the combination of a plurality of cards, each of said cards having examination questions thereon together with a multiple choice of answers to said questions, each question having only one correct answer, said cards being arranged in a predetermined sequence, card sequence determining means, each of said cards having means cooperating with said sequence determining means and characterising the position of the card in said predetermined sequence, an electronic memory having a section thereof associated with each of the examination questions, means programming said electronic memory, each of said cards having a code associated with said programming means for programming said electronic memory, recording means, means connected to said recording means for scanning an auxiliary memory for correct answers, said auxiliary memory controlling said recording means to produce a record of said correct answers, means erasing said auxiliary memory after said scanning thereof, said means cooperating with said sequence determining means conditioning said sequence determining means to be responsive to the next card in said predetermined sequence after the recording of the answers by recording means from the previous card.

2. In apparatus for conducting examination of students and recording the results thereof, the combination as set forth in claim 1, further characterised in that said programming means comprises a plurality of electric switches selected ones of which are adapted to be closed as determined by said code, said switches being connected to a source of current supply for activating predetermined storage devices in said memory as determined by said code, and means controlling said current supply, said last mentioned means being responsive to said card sequence determining means.

3. In apparatus for conducting examinations of students and recording the results thereof, the combination of means having examination questions reproduced thereon together with a multiple choice of answers to said questions, only one of which is a correct answer to each question, said means comprising a plurality of cards arranged in a predetermined sequence, each of said cards having sequence determining means determining the position of the card in said predetermined sequence, an electronic memory having a section thereof adapted to be associated with each of the examination questions, each of said cards having a code correlated with answers to said questions for controlling the programming of said memory, means programming said memory comprising a plurality of electric switches selected ones of which are adapted to be closed as determined by said code, said memory including a plurality of storage devices, said switches being connected to a source of current supply for charging said storage devices in said memory as determined by said code, means responsive to said card sequence determining means for controlling said current supply to said memory, an auxiliary memory associated with said electronic memory, means adapted to be operated by the student and associated with said first mentioned means and with said electronic memory for activating said auxiliary memory when the correct answer is selected by the student for a predetermined question, recording means comprising a tape, means advancing said tape, a predetermined amount for each of said examination questions, scanning means for scanning said auxiliary memory for correct answers, and means controlled by said scanning means marking said tape for each correct answer.

4. In apparatus for conducting examination of students and recording the results thereof, the combination as set forth in claim 3, further comprising a motor driving said advancing means and said scanning means, said card sequence determining means comprising a step switch, and means controlled by said motor advancing said step switch after said scanning means scans said auxiliary memory for conditioning said card sequence determining means to respond to the next card in the predetermined sequence.

References Cited
UNITED STATES PATENTS

| | | | |
|---|---|---|---|
| 3,050,248 | 8/1962 | Lindquist | 35—48.2 |
| 3,141,243 | 7/1964 | Chapman et al. | 35—48 |
| 3,327,405 | 6/1967 | Ingeneri | 35—9 |
| 3,359,655 | 12/1967 | Audebert | 35—48 |

EUGENE R. CAPOZIO, Primary Examiner

J. H. WOLFF, Assistant Examiner